United States Patent [19]

Hofmeester

[11] Patent Number: 4,966,123
[45] Date of Patent: Oct. 30, 1990

[54] APPARATUS FOR THE MIXING OF GAS OR GASES WITH AIR IN A CONTROLLABLE RATIO FOR A COMBUSTION-ENGINE

[76] Inventor: Paul M. Hofmeester, Hoftech Metaalbewerking en Apparatenbouw Postbus 35043, 3005 DA Rotterdam, Netherlands

[21] Appl. No.: 423,750

[22] Filed: Oct. 19, 1989

Related U.S. Application Data

[63] Continuation of Ser. No. 187,153, Apr. 28, 1988, abandoned.

[30] Foreign Application Priority Data

Apr. 28, 1987 [NL] Netherlands ............... 8700996

[51] Int. Cl.⁵ .................................. F02M 29/02
[52] U.S. Cl. ......................... 123/592; 48/189.4
[58] Field of Search ............ 123/592; 48/189.4, 189.5

[56] References Cited

U.S. PATENT DOCUMENTS

| | | | |
|---|---|---|---|
| 3,847,128 | 11/1974 | Palotsee | 48/189.5 |
| 4,335,697 | 6/1982 | McLean | 123/527 |
| 4,387,689 | 6/1983 | Brown | 123/527 |
| 4,430,095 | 2/1984 | Gilbert | 48/189.5 |
| 4,479,466 | 10/1984 | Greenway et al. | 123/527 |
| 4,574,763 | 3/1986 | Halberg | 123/527 |
| 4,594,990 | 6/1986 | Batchelor | 123/527 |
| 4,729,776 | 3/1988 | Elliff | 123/592 |

Primary Examiner—E. Rollins Cross
Attorney, Agent, or Firm—Finnegan, Henderson, Farabow, Garrett & Dunner

[57] ABSTRACT

The invention refers to the mixing of gas or gases with air, in a controllable ratio, by means of a mixing apparatus wherein the entrance air is forced in a complete developed rotation stream, by which a strong suction pressure is created in the center, so that gas can be sucked in ratio independent of the total volume per second. The mixing ratio of gas and air is controlled through an adjustable angle of the air entrance nozzles. The rotating airstream is accelerated in the radial entrance plane and via a logarithmic curved profile, the airstream is guided in the axial outlet direction of the mixing apparatus. The rotating airstream develops a center-core stream, where inside it a maximal underpressure is created. By this underpressure, the main gasstream can be sucked and mixed with the airstream via the whirl grates, which are fixed in the outletsection just in front of the mixture outlet valve.

13 Claims, 3 Drawing Sheets

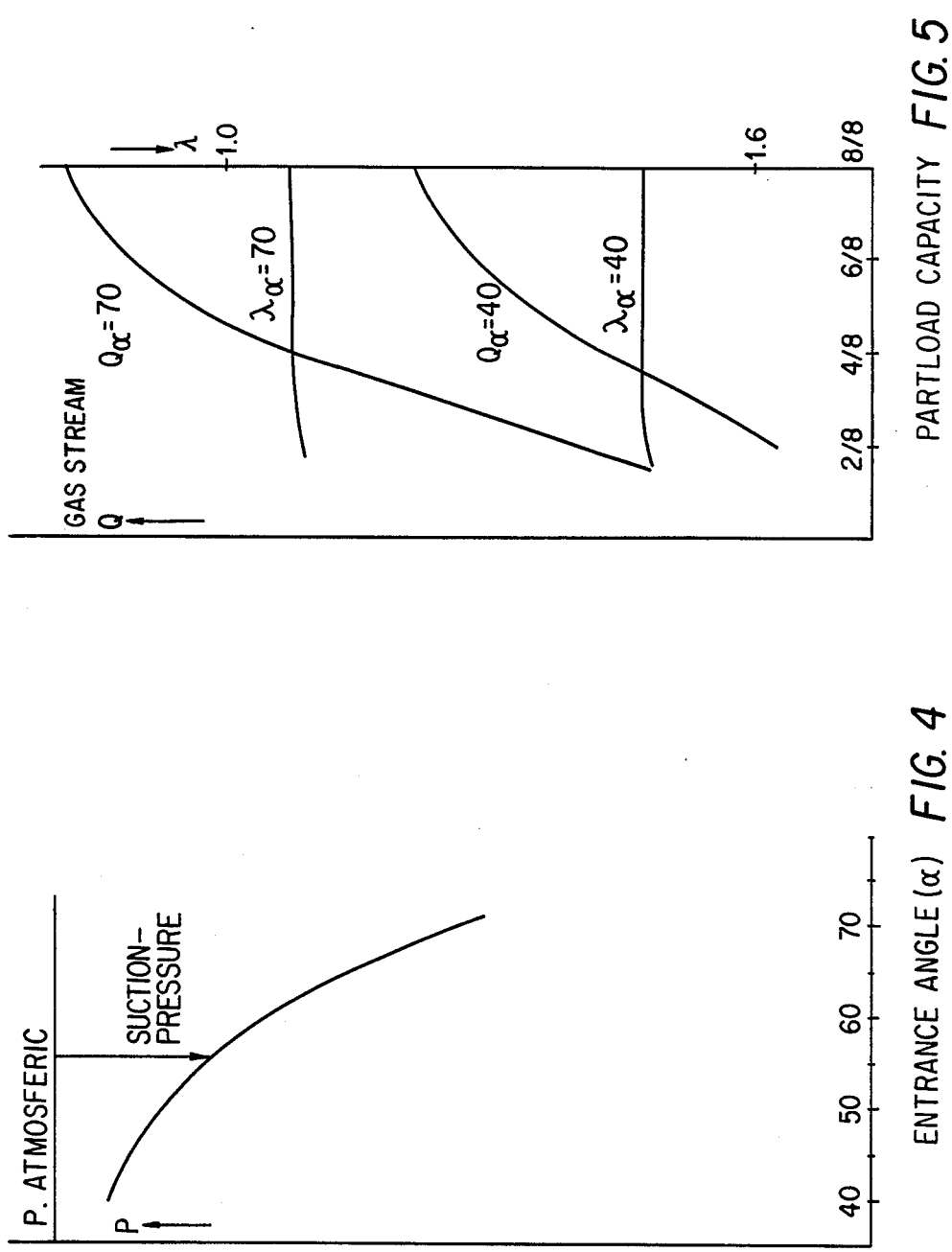

APPARATUS FOR THE MIXING OF GAS OR GASES WITH AIR IN A CONTROLLABLE RATIO FOR A COMBUSTION-ENGINE

This application is a continuation of application Ser. No. 07/187,153, filed Apr. 28, 1988, now abandoned.

FIELD OF INVENTION

This invention relates to apparatus for the homogenous mixing of gaseous fuels for a combustion engine.

BACKGROUND OF THE INVENTION

For stationary or traction combustion-engines, generally a gaseous fuel is supplied at about atmospheric pressure and mixed with air in a gas-air mixer. This low pressure is required to prevent that gas from streaming outside the mixer before starting or when the engine is standing still, which causes a danger of explosion. Such gas-air mixtures are led directly after mixing to the combustion chambers of the combustion engine. As a fuel, gaseous fuels or fluidic fuels are applied.

For the combustion process, the gas-air mixing ration is of prime importance and is called stoichiometric, as just enough air is present for the complete combustion of the present gas volume. Generally excess air is applied or inert (exhaust) gas is added to the combustion mixture to reduce the undesired oxygen-nitrogen combinations.

As a gaseous fuel, generally natural gas, propane or LPG is used. The stoichiometric air-gas ratio is defined as lambda 1.0 and is one of the most important variables for the combustion process, as are the composition and temperature of the exhaust gases. Generally the combustion in gas engines is performed with a lambda value between 1.0 (rich mixture) and 1.6 (lean mixture), whereby a complete combustion of the mixture in the combustion engine is possible.

For lean mixtures a higher compression ratio is employed, without causing detonation, as compared to rich mixtures. The sucking of gas-air mixtures according to the Dutch Patent No. 7605655 is effected by the vacuum pressure of the engine. The sucked air is accelerated in a venturi-tube, by which an underpressure is created for the sucking of the gas in the narrowest section of the annular venturi-tube. The gas volume can be controlled by choking the gas inlet opening by means of a complicated system of membranes and springs, which are activated by the engine vacuum pressure.

However, it appears that harmful non-homogeneity of the mixture remains due to high air speeds in the venturi and consequent short residence-times in the mixer and due to the one-sided gas supply in the throat of the venturi. The drawback of the non-homogenous mixture is overcome by our invention, due to whirling between the created rotational air stream and line air gas stream.

According to the U.S. Pat. No. 2,565,907 the suction of a secondary stream takes place by the expansion in a tangential direction of a primary stream. At the same time, also a strong rotation is developed, which transports the secondary fluid via an annular opening to the place of higher pressure than the suction pressure of the secondary medium itself.

The drawback of this compressive action is that compressed air is required for the expansion process and to overcome the relatively high resistance in the annular opening.

Besides, the nozzles are fixed and convergent for the expansion of the prime medium and also there is the danger of streaming of prime medium in the outlet of the secondary medium when insufficient discharge of the mixture occurs.

SUMMARY OF THE INVENTION

It is the principal object of the present invention to provide a mixing apparatus, that forces the air stream entering the apparatus radially into a spiralling air stream by means of air nozzles spaced equally around the circumference of the air entrance.

In accordance with the present invention a strong subatmospheric pressure is created in the center of the spiralling air stream. The gaseous fuel enters a mixing room of the apparatus as a linear center core stream, filling up the subatmospheric pressure zone and creating simultaneously turbulent whirling by hitting the spiralling air stream. The mixing ratio depends on the magnitude of the developed underpressure, and successively on the air rotation and angle of the air nozzles.

More specifically the spiralling air stream is characterized as a "rotation-free potential stream" around a center core stream. The circulation velocity at a point of this "rotation-free" stream is inversely proportional to the radial distance from the center line (FIG. 3).

By the deflection of the spiralling air stream passing from the inlet section into the axial direction of the mixer a "non-rotation free" center core stream appears. Thereby, the circulation velocity is directly proportional to the radius from the center-line. Such a situation does exist in the natural cyclones where the highest velocities are developed at the circumference of the center core stream.

The kinetic energy of the center core stream is small compared to the kinetic energy of the surrounding stream, or in other words, the behavior of the center core stream is determined by the surrounding stream around the center core. Consequently, the magnitude of the surrounding stream will be larger than the center core stream.

The center core diameter is determined by the geometry of the vortex flange member. The surrounding stream is initiated and controlled by the adjustable air nozzles. An air molecule will accelerate during its spiral-wise route into the mixer and increase in kinetic energy.

From the mathematical description of the "potential" stream it can be learned that the developed underpressure is proportional to the square of the "angle speed" and the "center core radius."

By this underpressure the gas is sucked. When the gas is supplied at atmospheric pressure by means of a zero-pressure regulator, then it is derived that the gas-air ratio only depends on the angle of the air-inlet nozzles, based on fixed geometry of the mixer and the density of gas and air. When the underpressure in the mixer is considered as a parameter for the gas suction capacity, then the relation between air nozzle angle and the load of the engine can be shown.

Another aspect of the invention is the application of an adjustment mechanism: a ring, connected to the air nozzles to enable the equal positioning of all nozzles simultaneously.

The angle of the air nozzles determine successively the magnitude of the rotation, developed underpressure and gas to air mixing ratio. By doing so the lambda value is controllable in such way, that for each angle of the air nozzles one specific lambda can be obtained without changing the air volume. It is also possible to replace the air stream partly by inert gas, with the aim to replace the excess air completely in order to reduce the NO-x formation.

The invention provides in a second gas inlet, where the inert gas can be sucked via an annular chamber with a pattern of openings positioned just behind the air nozzles.

In this way the inert gas replaces a part of the air stream before the mixing with gaseous fuel, while the total flow is not significantly changed. Both streams, the gaseous fuel and the inert gas stream, can be pre-adjusted by means of restrictions in the supply.

BRIEF DESCRIPTION OF THE DRAWINGS

The present invention will be better understood by the following description thereof read with reference to the accompanying drawings wherein:

FIG. 4 is a plot showing the influence of the air nozzle angle on the suction pressure; and FIG. 5 shows the relation between the engine load and sucked gas flow at various lambda values.

DETAILED DESCRIPTION OF PREFERRED EMBODIMENT

Figure 1:
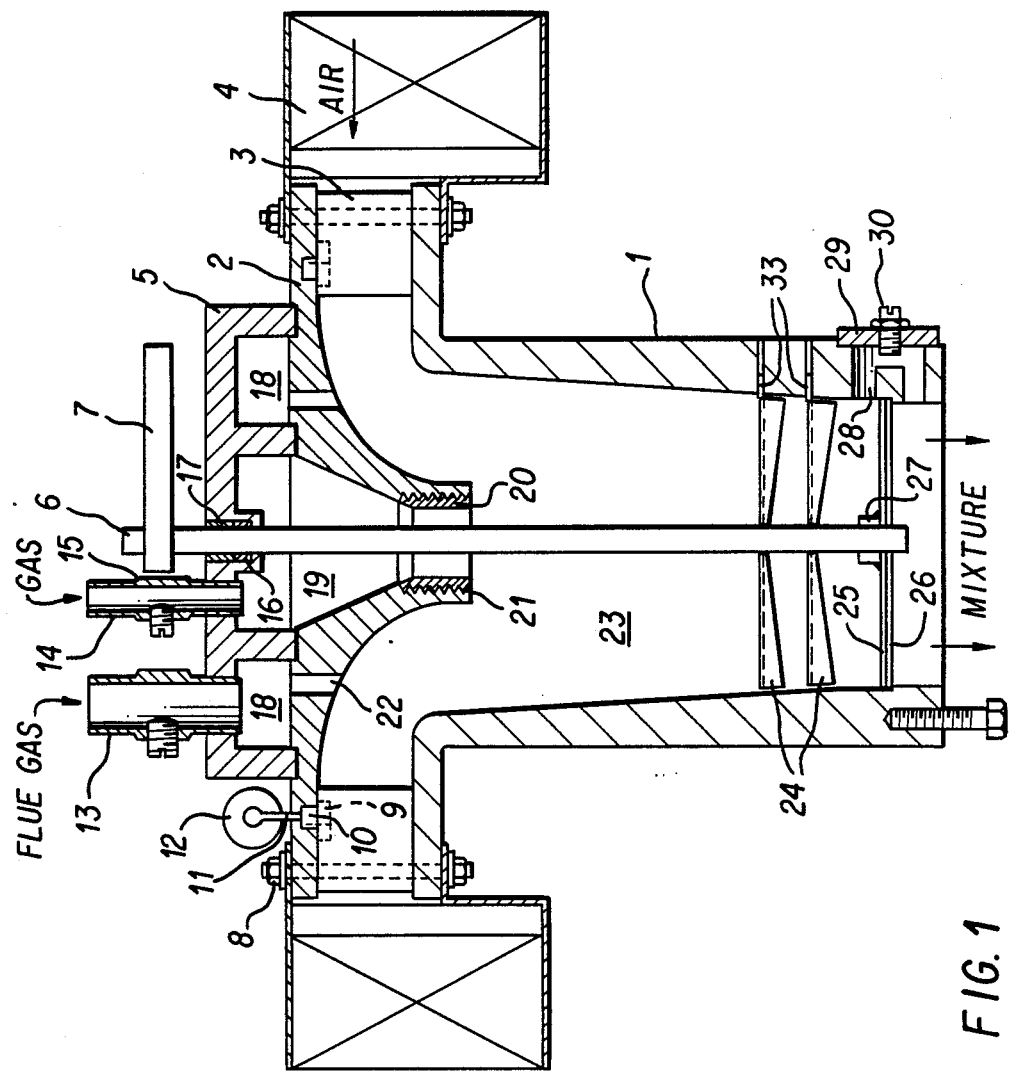
FIG. 1 is an elevational view in cross-section of a preferred embodiment of the present invention.
Figure 3:
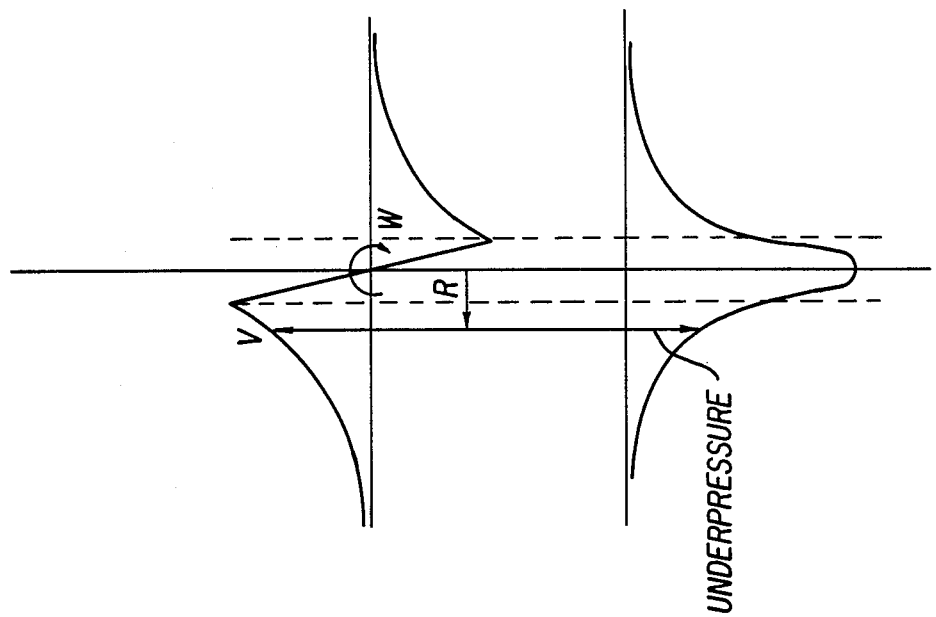
FIG. 3 is a diagrammatic representation of the circulation velocities of gas in the apparatus of FIG. 1.

The mixer-apparatus is based on the above described mixing principle. The apparatus is an assembly of a three-part body as shown in FIG. 1: mixer house 1, the vortex flange 2 and the gas inlet flange 5. The air is sucked via the air filter 4 and is forced into stream through a number of air-entry nozzles 3 equally positioned at the circumference of the air inlet section.

The angle of the nozzles 3 is adjustable around a special pivot-shaft 8. These pivot-shafts carry the vortex-flange at fixed interspace to the mixer house 1 in such way that the air nozzles 3 can be swivelled. The gas inlet flange 5 is mounted on the vortex-flange 2 in such way that a gas chamber 19 and an inert gas chamber 18 are obtained. The inert gas and gaseous fuel are supplied via restrictions 13 and 14 to the gas chambers 18 and 19 respectively.

Centrally positioned in the vortex flange one gas-nozzle 20 is attached by threads 21 to feed the gas from gas chamber 19 to the mixer room 23. The inert gas in chamber 18 is fed to the mixer room 23 by means of a plurality of apertures 22 in the vortex flange 2. Further downwards in the mixer room 23 two or three whirl-grates 24 are mounted with screws 33 as a means for completion of the mixing process.

Those whirl-grates consist of a number of similar curved blades, connected by a central ring. The whirl-grates accelerate the swirling of the gas-air mixture between throttle valve 25,26 in the mixing chamber 23.

Figure 2:
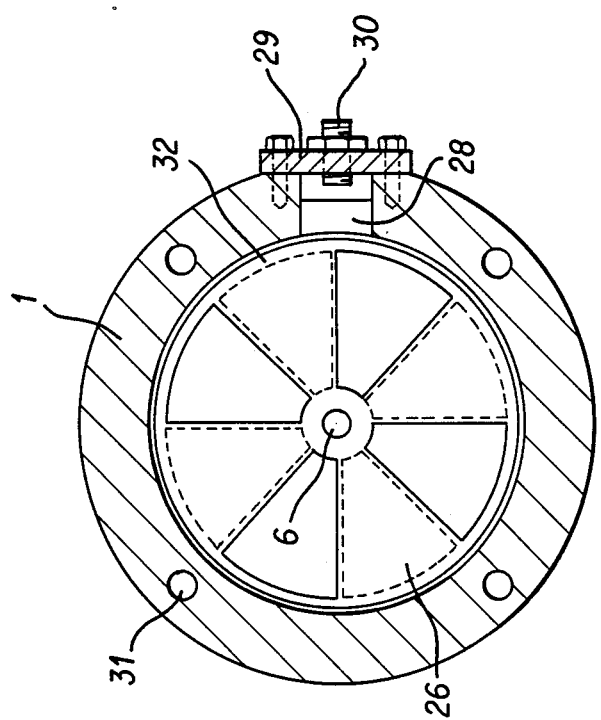
FIG. 2 is a bottom view in cross-section of the apparatus of FIG. 1.

The homogenous gas-air mixture is fed to the engine via the throttle valve 25,26 in such way that the volume of the mixture stream is controlled by the turning of symmetric segment openings 26 of both valve-plates of the throttle valve, as shown in FIG. 2.

Turning of the segment openings with the shaft 6 and lever 7, implicates the fixation of valve plate 26 in the mixer house 1 and the mounting of valve plate 25 to the throttle valve shaft 6 with the cam 27.

The segment openings of the valve plates are such, that an as large as possible flow opening of the throttle valve is obtained, while also being capable of cutting off the flow completely. With the throttled valve closed however idle running of the engine shall be possible. For that purpose a bypass channel 28 is formed around the throttle valve. The flow for idle running is adjustable by means of the adjusting screw 30 in the cap 29.

The gas-air mixer is vertically or horizontally mounted with bolts at the bottom side of the house to the combustion engine. Apart from the manual angle adjustment of the air inlet nozzles 3, the mixing ration can also be controlled during operation by means of one single mechanism or step positioner motor 12.

The adjusting mechanism consists of an adjustment rod, connected to pin 11, which turns ring 10. The ring 10 is positioned in a circular groove in the vortex flange 2 and is connected with the air nozzles via a sliding-pin in a groove of each air nozzle. By a turning length of a few centimeters for the ring 10, all the air nozzles can be adjusted between 40 and 70 degrees simultaneously.

Having described a preferred embodiment of the present invention, it is to be understood that variations and modifications thereof within the spirit of the invention may become apparent to those skilled in the art, and the scope of the present invention is to be determined by the attached claims and their equivalents.

What is claimed is:

1. Apparatus for forming a homogenous mixture of air and combustion gas to be supplied to a combustion engine in a controllable mixing ratio which apparatus comprises:

(a) a mixer body formed of an elongated cylindrical mixer house, having a first end and a second end, for mixing said air and combustion gas; a vortex flange member spaced from said first end for introducing said air and combustion gas into the interior of said mixer house; and a gas inlet flange member on said vertex flange member remote from said mixer house for receiving at least said combustion gas;

(b) a plurality of air-guiding nozzles spaced equally around the circumference of said first end between said vortex flange and said first end for directing air radially into said mixer house at an angle, each of said air-entry nozzles being pivotally mounted on a pivot-shaft extending between said first end and said vortex flange so that said angle is adjustable to control the angle of air fed into said mixer house and provide a spiralling air stream circulating around the interior of said mixer house toward said second end;

(c) combustion gas inlet means comprising a centrally positioned opening in said vortex flange for introducing said combustion gas into the central portion of said mixer house;

(d) gas mixing means intermediate said centrally positioned opening and said second end for forming a homogenous mixture of said spiralling air and said combustion gas; and (e) throttle valve means intermediate said gas mixing means and said second end for controlling the volume of said homogenous gas mixture to be supplied to said engine.

2. The apparatus of claim 1, further including an adjustment mechanism for adjusting said angle of said air-guiding nozzles, said mechanism including a ring in a circular groove in said vortex flange, said ring being connected with each of said air-guiding nozzles by a pin member; and an electric positioner motor for turning said ring, so that said angle of said air-guiding nozzles can be adjusted.

3. The apparatus of claim 2, wherein the angle of said air-guiding nozzles can be simultaneously adjusted between 40 and 70 degrees.

4. The apparatus of claim 1, wherein said gas inlet flange is provided with adjustable combustion gas restriction means and adjustable flu gas restriction means for adjusting the flow of said combustion gas and a flue gas, respectively, and there is provided combustion gas chamber means in flow communication with said combustion gas restriction means and flue gas chamber means in flow communication with said flue gas restriction means, each of said chamber means being in flow communication with the interior of said mixer house and for introducing one of said gases thereinto.

5. The apparatus of claim 1, wherein said vortex flange has a curved cone-shaped central portion extending toward the interior of said mixer house and providing a cone-shaped central opening in flow communication with the interior of said mixer house.

6. The apparatus of claim 5, wherein said air guiding nozzles are located radially opposite the curved portion of said cone-shaped central portion.

7. The apparatus of claim 1, wherein said gas mixing means comprises a plurality of whirling grates each having a plurality of radially extending curved blades.

8. The apparatus of claim 1, wherein said throttle valve comprises a fixed plate and an adjacent rotatable plate, each plate having segment-shaped openings therein, and said rotatable plate capable of being rotated with respect to said fixed plate between a complete open position and a complete closed position, so that in said open position said gas mixture can flow through said segment-shaped openings into said engine and in said closed position the gas flow through said openings is cut off.

9. The apparatus of claim 8, where in the complete open position a maximal throughput area through said openings of 45% is obtained and in the complete closed position said throughput area is 0%.

10. The apparatus of claim 8, wherein there is further included a bypass channel around said throttle valve and an adjusting screw extending into said channel for adjusting the idle running of said engine when said throttle valve is in the complete closed position.

11. The apparatus of claim 1, further including means for concentrically mounting an air filter around the space between said vortex flange and said first end of said mixer house for filtering air passing into said air-guiding nozzles.

12. A method for controlling the mixing ratio of a combustion gas and air to be supplied to a combustion engine, which method comprises:
(a) introducing an air stream radially and at an angle into a first end of a cylindrical mixing chamber through a plurality of adjustable air nozzles spaced around said first end to create a spiralling air stream flowing through said chamber toward a second end thereof, said spiralling air stream having a low pressure central core portion and a higher pressure radially outward portion, said nozzles being capable of being adjusted to controlling the angle at which said air is introduced into said chamber;
(b) introducing a combustion gas into said chamber at a point adjacent said first end into said core portion of said spiralling air stream;
(c) mixing said air and said combustion gas to form a homogenous mixture thereof downstream of said point of introduction of said combustion gas; and
(d) controlling the volume of said homogenous gas mixture to be supplied to said engine.

13. The method of claim 12, wherein the velocity of said spiralling air stream is controlled, by adjusting the angle at which said air is introduced into said chamber, to obtain the desired pressure in said core portion, to thereby suck said combustion gas into said chamber and provide the desired gas-air mixing ratio.

* * * * *